United States Patent
Fritz

[15] 3,646,735
[45] Mar. 7, 1972

[54] FORAGE HARVESTER COMBINATION
[72] Inventor: Edward A. Fritz, Hinsdale, Ill.
[73] Assignee: International Harvester Company, Chicago, Ill.
[22] Filed: May 11, 1970
[21] Appl. No.: 36,199

[52] U.S. Cl. ................................56/14.7, 56/DIG. 9, 56/2
[51] Int. Cl. ....................................................A01d 69/00
[58] Field of Search .....................56/10.9, 14.7, 14.9, 15.1, 56/15.7, 15.9, 13.5, 14.5, 15.2, 208, 209, 210, 2

[56] References Cited

UNITED STATES PATENTS

| | | |
|---|---|---|
| 3,293,835 | 12/1966 | Gehman et al..........................56/15.9 |
| 3,425,194 | 2/1969 | Stott et al. .............................56/14.7 |

*Primary Examiner*—Antonio F. Guida
*Attorney*—Floyd B. Harman

[57] ABSTRACT

A forage harvester combination including a basic harvester unit such as a chopper, adapted for securement to a draft implement and adapted for attachment thereto of each of a plurality of attachment harvester units, of different weights, such as a hay pickup unit, row crop unit, etc., each different attachment unit having respective points for anchoring it with the basic unit positioned according to its weight; means for raising and lowering the attachment unit for positioning it at different parallel operating levels, and for raising it to a higher tilted transport position; and resilient means for cushioning the lowering of the attachment unit to prevent breakage in the event it encounters a nonyielding obstacle.

10 Claims, 11 Drawing Figures

PATENTED MAR 7 1972 3,646,735
SHEET 1 OF 3
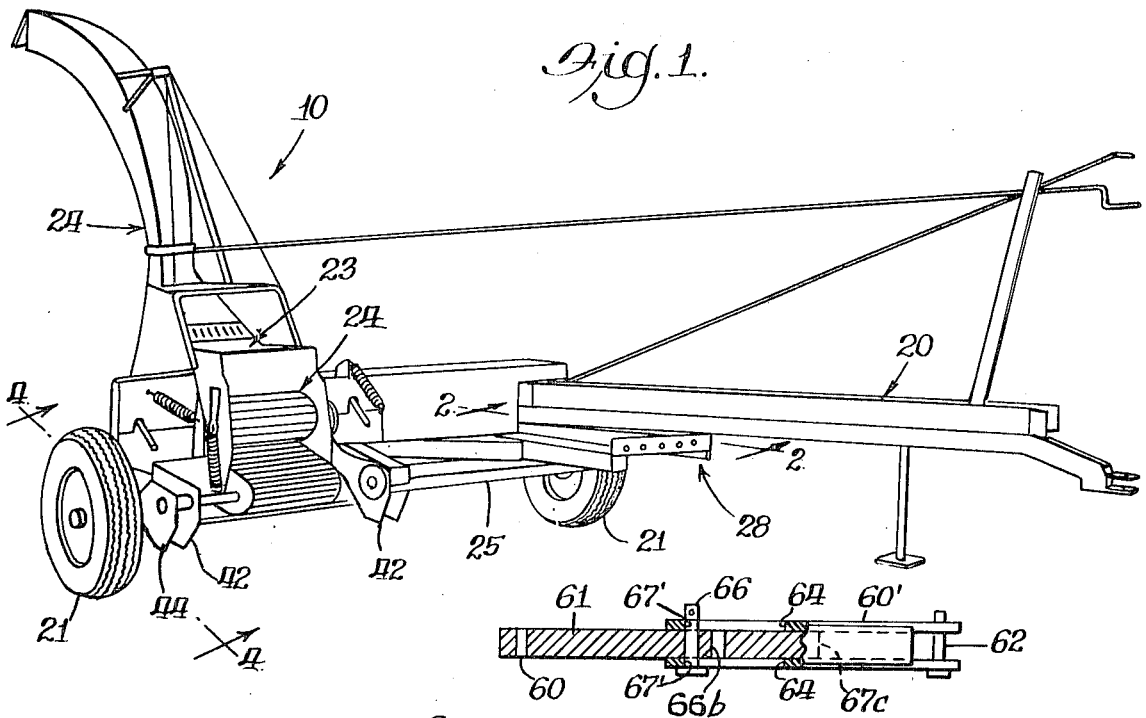
Fig. 1.
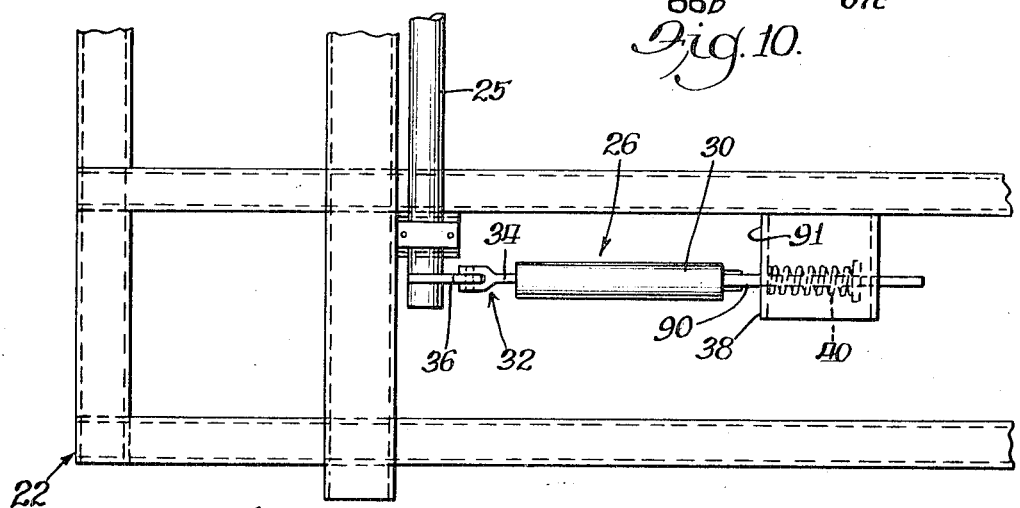
Fig. 10.
Fig. 3.
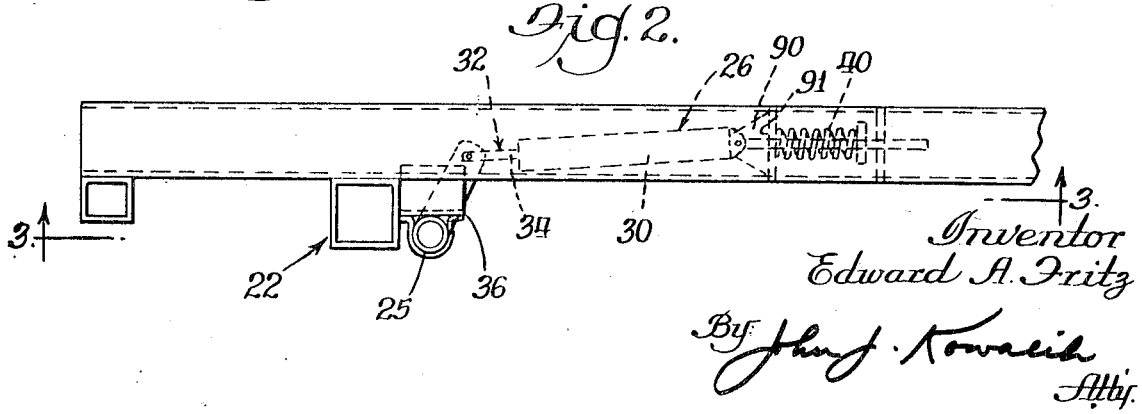
Fig. 2.
Inventor
Edward A. Fritz
By John J. Kowalik
Atty.

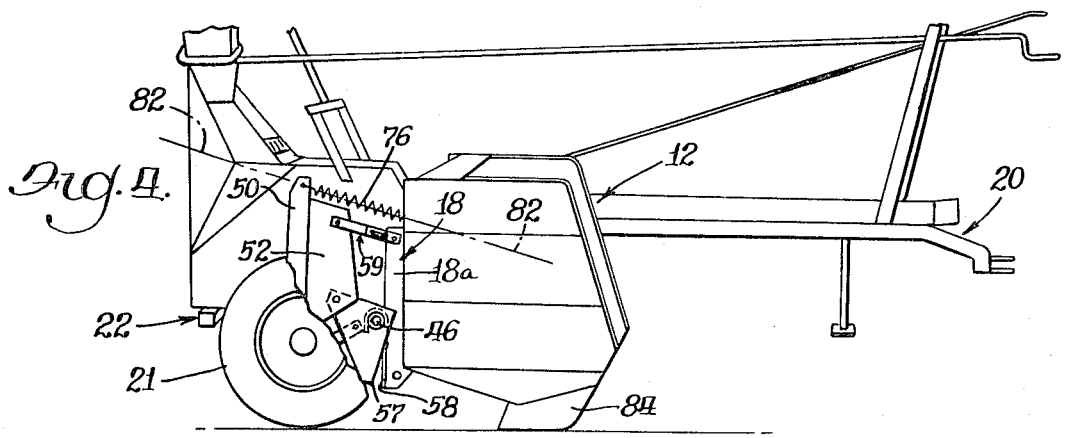
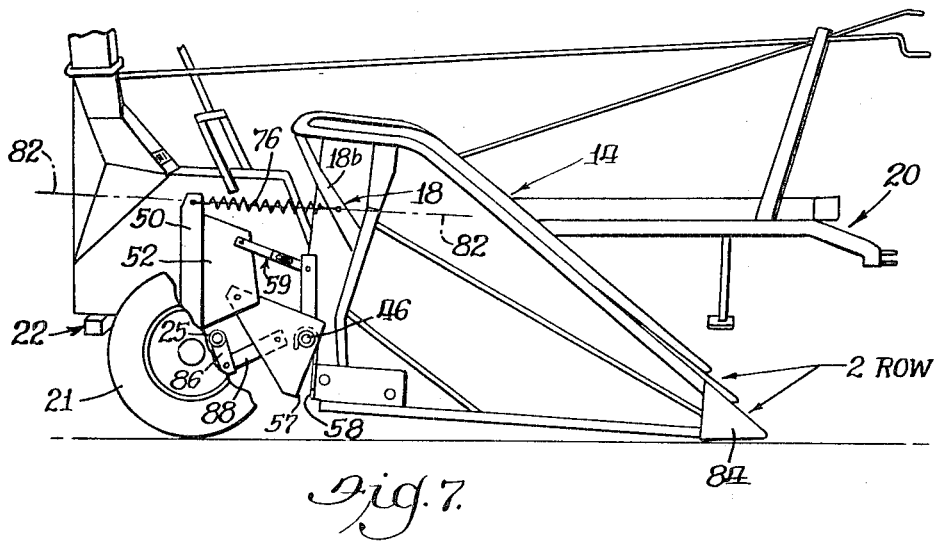
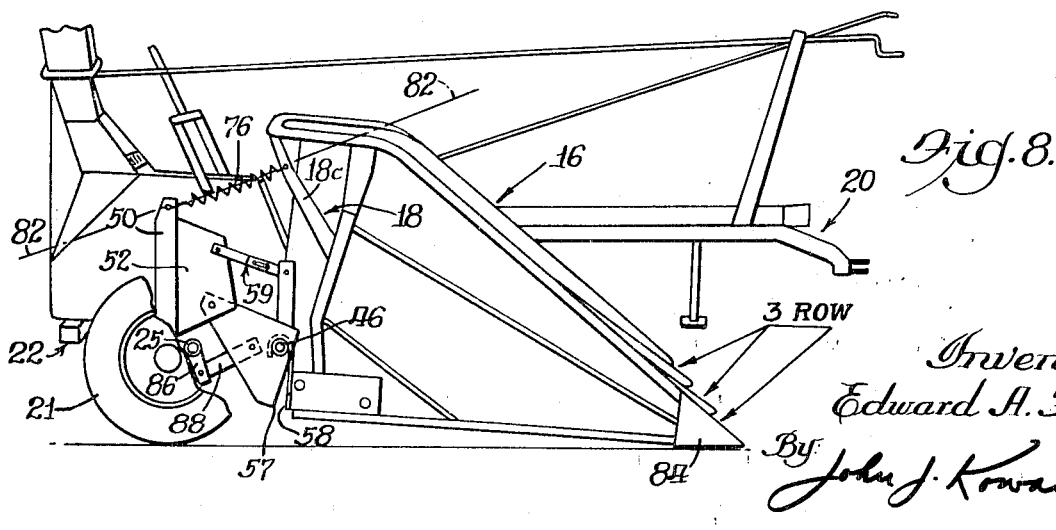

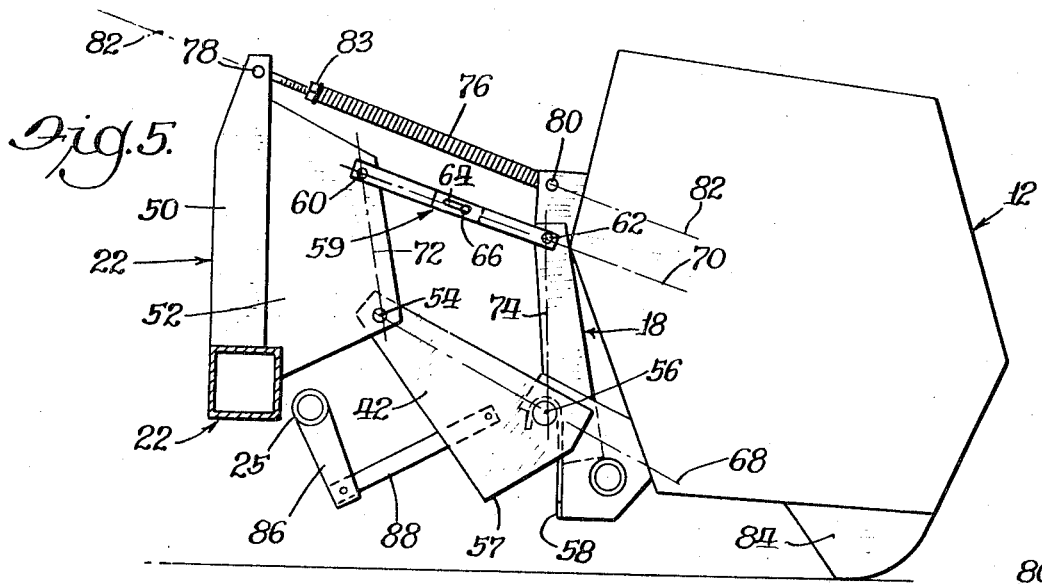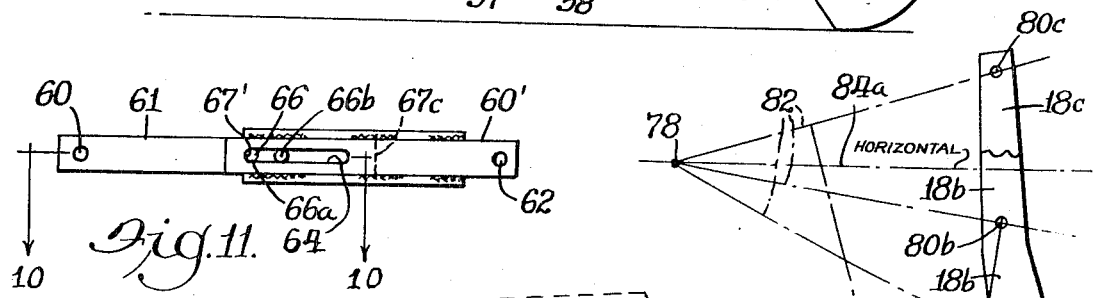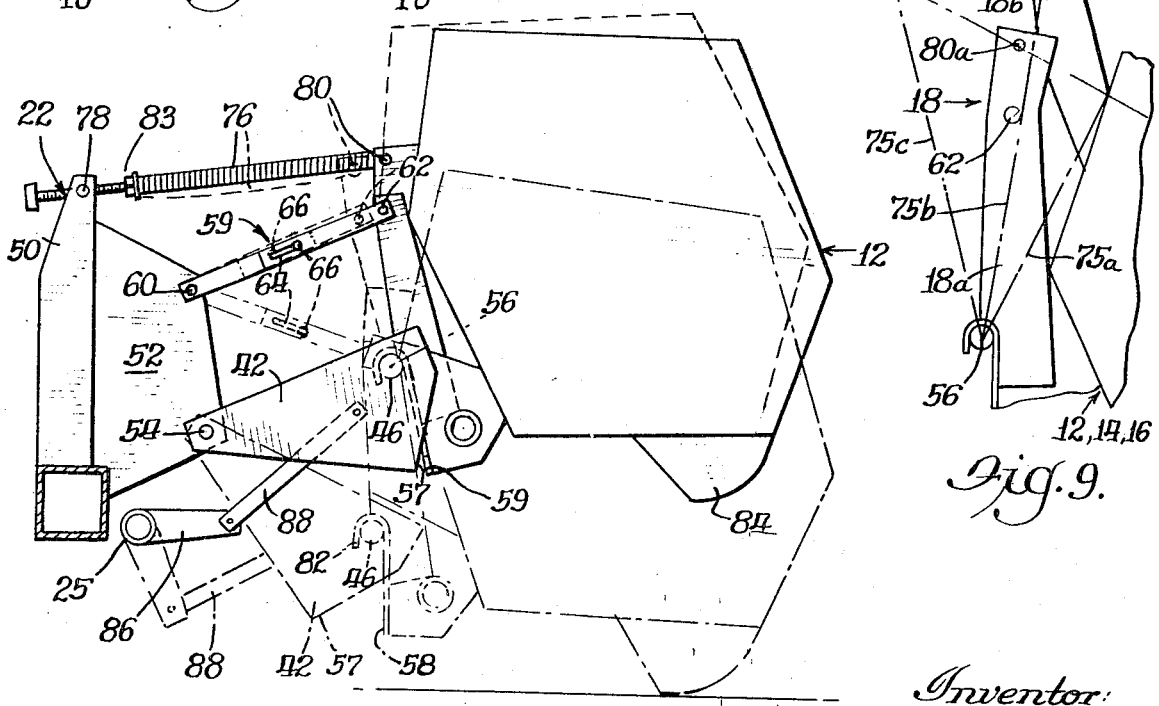

FORAGE HARVESTER COMBINATION

FIELD OF THE INVENTION

The invention resides in that field of forage harvester device which includes a basic harvester unit such as a chopper, and any of several attachment harvester units mounted on and carried by the basic harvester unit, such as a hay pickup, forage harvester, etc., and wherein the different attachment units are of different weights and thereby require securement to the basic unit in a manner according to the different weights thereof.

OBJECTS OF THE INVENTION

A broad object of the invention is to provide a forage harvester combination of the foregoing general character which comprises a basic harvester unit and a plurality of attachment harvester units, individually usable with the basic unit, in which the different attachment units are of different weight characteristics, and including novel means for mounting the attachment units according to the weight characteristics of each.

Another broad object is to provide a forage harvester combination of the foregoing character which includes means for vertically moving each attachment unit within a working range in which the attachment unit is maintained in a predetermined operating attitude, and at the upper limit of that range, it is tilted into a transport position.

A still further object is to provide a forage harvester combination of the foregoing general character which includes novel means for providing floating support of the attachment unit.

Still another object of the invention is to provide a forage harvester combination which includes a plurality of attachment units of different weight characteristics, and an arrangement for floatingly supporting the attachment units according to the weight characteristics of the different units and without requiring special adjustment for the different units other than merely connecting the attachment units at predetermined points according to their weight characteristics.

Still another object is to provide a forage harvester combination having a novel arrangement for supporting the attachment unit in the vertical parallel movements of the latter in a predetermined constant operating positional attitude, which includes a tension link which remains constant in the normal vertical movements of the attachment unit but which is arranged for collapsing for enabling the attachment unit to be moved angularly to a tilted transport position above the normal maximum range of operational movement.

Still another object is to provide a forage harvester combination which includes a basic unit which engages and rides on the ground, and which is arranged for mounting thereon and carrying any of a plurality of attachment units of respectively different weight characteristics, and including a four-bar linkage supporting arrangement for vertically moving the attachment unit throughout a working range in which the attachment unit is maintained in a substantially constant positional attitude of operation, and in which the respective attachment harvester units have correspondingly different points for connection to the basic harvester unit whereby the different attachment units are supported in substantially the same attitude independently of the weight characteristics thereof, and further whereby each attachment unit, when it reaches the upper limit of its working range, is tilted upwardly and rearwardly relative to the basic unit, out of its operational range and into a transport position.

A still further object is to provide a forage harvester combination of the foregoing character which includes novel means for cushioning the descent of the attachment units as power is applied for lowering it and it encounters a nonyielding obstacle.

BRIEF DESCRIPTION OF THE DRAWINGS

FIG. 1 is a perspective view of a basic forage harvester unit forming a component of a combination to which the present invention is applied;

FIG. 2 is a detail view of an element of the basic harvester unit oriented according to line 2—2 of FIG. 1;

FIG. 3 is a plan view of the detail of FIG. 2, oriented according to the line 3—3 of FIG. 2;

FIG. 4 is a side view of the basic unit of FIG. 1 and one of the several attachment units, oriented according to the arrow 4 of FIG. 1;

FIG. 5 is a large scale view of a portion of FIG. 4 showing in detail various elements of the structure of the harvester combination;

FIG. 6 is a view similar to FIG. 5 but on a smaller scale and including representations of three positions of the attachment unit relative to the basic unit;

FIG. 7 is a side view similar to FIG. 4 but showing another attachment unit, namely a heavier unit;

FIG. 8 is a view similar to FIGS. 4 and 7 but showing another attachment unit which is still heavier;

FIG. 9 is a diagrammatic representation of corresponding elements of the several attachment units and also showing relative points of connection thereof with the basic unit according to the weight characteristics of the respective attachment units.

FIG. 10 is an enlarged top view of the links; and

FIG. 11 is a side elevation of the structure shown in FIG. 10.

DESCRIPTION OF THE PREFERRED EMBODIMENT

Referring in detail to the accompanying drawings, attention is directed first to FIG. 1 showing a basic harvester unit 10 in general of known kind but including features incorporated in this invention. FIGS. 4, 7 and 8 show the same basic unit 10 but with different attachment units 12, 14 and 16 mounted thereon, the attachment units being of different weights from lighter to heavier in the order referred to. These attachment units, to be described hereinbelow, have a rear vertical frame member 18 in the same position in all the units, but having different points for connection with the basic unit according to their different weights. For convenience the frame members 18 are individually identified as 18a, 18b, and 18c in the order referred to. The basic unit adapted for riding on the ground and supporting the attachment units, being for example a chopper which may be utilized for chopping hay, or row crops such as cane, corn, etc., and includes a tongue 20, ground-engaging wheels 21 and a frame 22. It also includes a processing unit such as a cutter component 23, not shown in detail but well known, into which the crop plants are introduced by conveyor means 24 which receives them from the attachment unit, the crop plants then being cut by the cutter component 23 and delivered through a spout 24 into a suitable receptacle.

The basic unit 10 includes a transverse torque tube 25 which is actuated in a rocking motion by a preferably, though not necessarily, a double-acting actuator or cylinder-ram or hydraulic jack 26 (FIGS. 2, 3) mounted in a suitable location such as in an operational unit 28 (FIG. 1), and actuated by the usual power source on the draft implement. The jack 26 includes a cylinder 30 and a piston 32, the piston having a rod 34 pivotally connected with a radial arm 36 on the torque tube 25. The jack 26 upon extension rotates the torque tube 25 (counterclockwise direction) for elevating the attachment unit as referred to again hereinbelow and upon contraction it rotates it in the opposite direction for lowering the attachment. The cylinder 30 has rigid or positive reaction against a frame element 38 of the frame 22 in extending direction, but in contracting direction is cushioned by a compression spring 40 reacting between the cylinder and the frame such as through the same frame element 38.

The torque tube 25 is provided with a pair of lift arms 42 spaced laterally of the harvester unit and axially along the torque tube 25. Each of the lift arms 42 is composed of a pair of plates 44 mounted in and between which is a supporting element 46 utilized for directly supporting the attachment unit, in a manner described hereinbelow. FIGS. 4 and 5 show the lift arms 42 mounted in the frame 22 of the basic unit 10, which may include upright elements 50 and plates 52. The lift arms 42 are pivotally mounted in the plates 52 on an axis 54, and the supporting elements 46 define an axis 56 about which the attachment units pivot, as described hereinbelow. The lift arms 42 define a heel or lower corner 57 arranged for engaging an element 58 of the frame elements 18 on the attachment units.

Above the lift arms 42 are a pair of tension links 59 having one end pivotally mounted in the plates 52 on a transverse axis 60 and their other end pivotally mounted in the frame elements 18 in the attachment units on an axis 62. Each of the links 59 is made up of a pair of elements 60', 60', and an intervening element 61 in telescoping relation, the pair of elements 60' having transversely aligned elongated slots 64 and the element 61 including a pin 66 positionable in either opening 66a or 66b therein. The pin rides in the slots between upper and lower bridging members 67a and 67b interconnecting elements 60', 60'. The links have a range of extension movement provided by the length of the slots which have their rear edges 67' engaging the pin 66. Telescoping movement in contraction of the links 59 is limited through abutment of the front edge 67c of the element 61 with the attachment pin 62.

The lift arms 42 and the tension links 59 are in an arrangement close to parallel relation, although not necessarily exactly parallel, but they are generally referred to as parallel links. These links together with the elements on which they are mounted form a four-bar linkage conveniently identified by the line 68 extending between the pivot axes 54, 56; another line 70 extending between the axes 60, 62; a line 72 extending between the axes 60, 54; another line 74 extending between the axes 62, 56.

Above the four-bar linkage referred to, are tension float springs 76, secured at one end at points 78 in the frame elements 50 and at their other end at points 80 in the attachment units. The points 80 are at different relative positions in the different attachment units according to the weights of the different units. For convenience the line of extension of the springs is indicated at 82 (FIGS. 4, 5). These springs may have manually adjusting means 83 for adjusting the tension thereof although this adjusting means is considered not necessary but of only secondary convenience.

Referring to FIGS. 4-6, the attachment unit 12, a hay pickup unit, in itself is of known kind having for example hooks 82 for hooking onto the supporting elements 46 in a known manner, this supporting arrangement providing pivoting movement of the attachment unit about the axis 56 in the elements 46. In the normal positioning of the attachment unit 12, its forward end is inclined downwardly relative to the ground lines and provided with skids 84 normally riding on the ground, which when they encounter an obstacle such as a rise or rock, raise the front end of the unit and swing it about the pivot axis 56. In this swinging movement it is biased upwardly by the float springs 46 although the weight of the unit normally retains it in downward position.

The torque tube 25 is provided with a pair of radial arms 86 rigidly secured thereto at the outer ends of which are pivotally connected links 88 in turn connected with the lift arms 42, such as between the plates thereof. Upon rocking movement of the torque tube 25 in raising direction (counterclockwise FIG. 5) those arms and the links 88 are moved toward straightened position (FIGS. 5, 6) rocking the lift arms 42 in corresponding direction (counterclockwise) and thereby lifting the attachment unit 12. The lift arms 42 and links 59 being parallel, or nearly parallel, produce elevating movements of the attachment unit 12 in straight or parallel vertical direction, while maintaining it in the same operational position or attitude. In other words assuming a position of reference, in which the unit 12 is in its lowermost position, in this case for picking up hay from the ground, and it is desired to position the unit 12 at a higher position, the torque tube 25 is rotated in corresponding direction (counterclockwise FIG. 5) and the unit is elevated in substantially its same operational position or attitude. The range of this kind of raising is shown in FIG. 6, and in that Figure as between the first and second stages it will be seen that the range for this purpose is substantial.

Throughout this range, the heel or element 57 on the lift arms has not yet reached the element 59, but at the end of this range, and what determines this range, is that these two elements do interengage, and upon further movement of the lift arms 42, they positively lift the attachment unit and rotate it about the axis 46 into a tilted transport position shown in the third position of this figure.

The springs 76 provide a floating effect to bias the attachment unit upwardly in tilting direction about the axis 56 as the leading end of the attachment unit engages elevated obstacles. In the case of a lighter unit the float springs 76 are connected at a lower point, and in the case of heavier units the springs are attached at correspondingly higher positions, providing correspondingly longer lever arms for the heavier units as related to the axis 56 about which the attachment units pivot.

The attachment unit is supported rigidly by the lift arms 42 and tension links 59 throughout the vertical parallel movements of the attachment unit but in floating movements, as when the front end rocks about the pivot axis 56 in normal operation, the links 59 collapse or telescope as accommodated for by the slot-pin 64, 66 but limited by engagement of edge 67c with pin 62. When the attachment unit is tilted to transport position the linkage 59 and arms 42 act initially as a parallelogram or four-bar linkage. However, after predetermined upward movement of the harvesting component, the heels 57 of the lower lifting links engage the respective abutment surfaces 58 on the back edges of the associated component, whereupon the linkage 57, 42 no longer acts as parallel linkage, and the lower links 42 swing about the axes 54, 56 thus tilting the harvesting component to raise the forward ends thereof abruptly upwardly for good ground clearance.

In the case of the attachment unit 12 of FIG. 5 the float springs are connected at the lowest points, close to the axis 56. In the case of the other attachment units 14, 16, these are of progressively heavier weights. In the assumed example, both are row crop harvesting units, the unit 14 being for example a two-row crop harvester unit while the unit 16 is a three-row crop harvester unit, both of these units being of the same general nature, but of correspondingly different weights, and the consideration in mounting of these units in the harvester combination of the present invention is that regardless of the weights thereof they may be easily mounted, and there need be no major adjustments made for the desired mounting of the different units beyond mounting the float springs at different points in the attachment units. For example it will be seen that the float springs in the case of the three different attachment units in FIGS. 4, 7 and 8 respectively are attached in the frame elements 18 in the different attachment units in lower to higher positions according to the lighter to heavier weights. FIG. 9 includes a superimposition of the frame elements 18 indicating the axes 56, 62, and 80, the points 80 being individually identified as 80a, 80b and 80c respectively associated with the frame elements 18a, 18b and 18c on the different attachment units. In the case of the first attachment unit 12, the float springs are connected at the points 80a, closest to the pivot axis 56 with a lever arm 75a, while in the case of the intermediate attachment unit 14, the springs are attached at points 80b, with a lever arm 75b, and in the case of the heaviest attachment units 16 they are attached at the point 80c, farthest from the pivot axis 56 with a lever arm 75c. Accordingly, the float springs operate on the longest effective lever arm and produce the greatest mechanical advantage in the heaviest attachment unit for producing a floating effect. The float springs may assume angular positions relative to horizontal as indicated by the line 84a (FIG. 9), in being secured to the different units, these positions being representative.

As has been heretofore the custom, in the use of different attachment units of different weights, it has been necessary to make adjustments which were somewhat elaborate to accommodate the different attachment units, such as to adjust the tension of the float springs through the adjustment means 86 which was quite laborious. In the present instance there need be only minor adjustment of the tension if any at all, of the float springs in mounting the different attachments, the same tension on the float springs being effective on all of the attachments regardless of the weight, because of the different effective lever arms 75a, 75b, 75c established by the points 80a, 80b, and 80c. If it should be desired however to make different adjustments in the case of the different attachment units, this can nevertheless be done; it is possible that as between different operators, it is desired to suspend the different attachment units at different suspension conditions.

The attachment unit may be easily detached when in tilted or transport position as represented in FIG. 6; in this position substantially all of the tension is relieved from the float springs; also since the upper links 59 are collapsed, there is no tension thereon and they can be easily detached; the unit can then be removed from the support elements 46.

The jack or hydraulic ram 26 and its mounting described above, provides for a cushioning effect in lowering the attachment unit under power, this being of especial advantage in the case where the unit engages a nonyielding obstacle, in such event the spring 40 compresses, preventing breakage of any of the affected parts. It is however desired that in raising the unit, the jack be nonyielding in extension, as it is arranged here through physical engagement of abutment element 90 with the rigid stop 91 which is part of frame 22 as best seen in FIGS. 2 and 3.

The invention also includes the advantage that the parallel vertical movements, and the pivotal floating movements of the attachment units about their mounting points, minimize the moving joints during floating and thereby lessen the frictional losses of the mounting system. The collapsible tension links 59 enable the attachment unit to float independently of the four-bar linkage, in normal operation, and render it unnecessary to float through that linkage, and thereby provide the advantage stated.

Another advantage in addition to the one just stated, and notwithstanding it, is that if the attachment unit should encounter an obstacle tending to raise it beyond that accommodated by the tension links 59, the spring 40 will compress in a manner described in connection with lowering the unit under power, the unit will then float through the four-bar linkage, and thereby float to unusually great heights.

It will be appreciated that the attitude of the attached harvesting component is adapted to be modified between several positions by plowing pin 66 either in opening 66a or 66b. Since opening 66a is rearward of 66b, the unit attached will slope downwardly in comparison with the position of the unit where pin 66 is placed in opening 66b. Such optional placement of the pin 66 depends upon crop and terrain conditions as experienced by the operator.

What is claimed is:

1. A forage harvester combination comprising
   a. a basic harvester unit for riding on the ground and adapted for connection to a draft implement, and including means for transmitting power from the draft implement to the attachment unit identified hereinbelow,
   b. an attachment harvester unit mounted on and carried by the basic unit, and
   c. means for so mounting the attachment unit for pivoting, vertical and rearward tilting, movements, including
      1. a pivoted four-bar linkage interconnecting the units and enabling vertical movements of the attachment unit in a substantially constant positional operating attitude of that unit, within an operating range, and enabling rearward tilting thereof at the top of that range, and
      2. means responsive to the power-transmitting means for raising and lowering the attachment unit in a predetermined range essentially vertically, and
      3. means for rearwardly tilting the attachment unit at the top of that range.

2. A forage harvester combination according to claim 1 wherein the power for raising the attachment unit is transmitted through the four-bar linkage, and the four-bar linkage and the attachment unit have interengaging elements whereby the linkage positively tilts the attachment unit.

3. A forage harvester combination comprising
   a. a basic harvester unit for riding on the ground and adapted for connection to a draft implement, and including means for transmitting power from the draft implement to the attachment unit identified hereinbelow,
   b. an attachment harvester unit mounted on and carried by the basic unit, and
   c. means for so mounting the attachment unit for pivoting, vertical and rearward-tilting, movements, including
      1. a pivoted four-bar linkage interconnecting the units and enabling vertical movements of the attachment unit in a substantially constant positional operating attitude of that unit, within an operating range, and enabling rearward tilting thereof at the top of that range, and
      2. means responsive to the power-transmitting means for raising the attachment unit, and for rearwardly tilting it at the top of that range,
         wherein the power for raising the attachment unit is transmitted through the four-bar linkage, and the four-bar linkage and the attachment unit have interengaging elements whereby the linkage positively tilts the attachment unit,
         wherein the four-bar linkage includes a pair of vertically spaced links pivoted at one end in a fixed portion of the basic unit and at the other end in a fixed portion of the attachment unit, and wherein the means for tilting the attachment unit includes an eccentric element on one of the links arranged so that upon elevation of the links those elements engage the attachment unit at points eccentric to the axis of connection between that link and the attachment unit, and the other link effectively changes in length in the tilting movements of attachments.

4. A forage harvester combination according to claim 3 wherein the lower link is of fixed length and the upper link is telescopic and of changeable length, the upper link is of extended length when the attachment unit is in its operating range and the links rigidly support it in its constant positional attitude, in that range, and the upper link collapses in the tilting movement of the attachment unit.

5. A forage harvester combination according to claim 3 in which the upper links are rigid against bending transverse to their linear direction.

6. A forage harvester combination according to claim 1 wherein the attachment unit is supported on a tilting axis adjacent its lower portion, the combination also includes a tension float spring interconnecting the units above the links, the attachment unit is tilted forwardly by gravity into its said operating attitude, and the tension float spring biases it in rearwardly tilting direction.

7. A forage harvester combination according to claim 6 wherein when the attachment unit is in its said operational attitude, its lower portion slopes downwardly and forwardly, and its forward end is deflectable upwardly upon engagement at that end with an obstacle on the ground when the unit is in its said operating range, and the float spring provides a floating effect on the unit about said tilting axis.

8. A forage harvester combination according to claim 1 in which the four-bar linkage includes a pair of lower links of triangular shape pivoted at one end in a fixed portion of the basic unit and pivoted at the other end in a fixed portion of the attachment unit, and a pair of upper links pivoted at one end in the basic unit and at the other end in the attachment unit, the two pairs of links being pivoted on axes forming nearly a parallelogram, the upper links being extensible and collapsible, and the mounting of the attachment unit also including float springs above the four-bar linkage and connected in tension between the basic unit and the attachment unit and biasing the upper portion of the attachment unit rearwardly, the power means being operative for raising the lower triangular links and in doing so raising the attachment unit in nearly a straight line in which it maintains substantially its same positional operating attitude, and the triangularly shaped lower links having a heel portion eccentric to the pivot connection between those links and the attachment unit positioned for engagement with a fixed element of the attachment unit upon the lower links being elevated to a predetermined degree and thereafter tilting the attachment unit about the axis of its mounting on the lower links, the upper links contracting to accommodate such tilting movement, and the tension float springs biasing the upper portion of the attachment unit in tilted transporting position.

9. A forage harvester combination according to claim 8, wherein the power-transmitting means includes a transverse torque tube, actuating links interconnect the torque tube and lower links operative upon rocking of the torque tube for vertically moving the lower links and thereby the attachment unit, and the power-transmitting means also includes a hydraulic actuator for rocking the torque tube and thereby swinging the lower links.

10. A forage harvester combination comprising:
  a. a basic harvester unit riding on the ground and adapted for connection to a draft implement, and including means for transmitting power from the draft implement to the attachment units identified hereinbelow,
  b. a plurality of attachment harvester units of different weights,
  c. common means for mounting each attachment unit individually on the basic unit enabling pivoting of the attachment unit, and
  d. common means interconnectable with the basic unit and each attachment unit for floatingly biasing the attachment unit about the axis of its pivoting, and at a different point on each attachment unit according to its weight whereby to produce substantially the same floating condition on all the attachment units in a given biasing condition of the common means and wherein:
  a. the mounting means includes
    1. a pair of lower links pivoted on the basic unit on a transverse axis and having mounting elements on their extended swinging ends,
    2. a pair of upper links pivoted on the basic unit also on a transverse axis, and being of telescopic character and having positive stop elements defining the telescoping limits, HAVING POSITIVE STOP ELEMENTS DEFINING THE TELESCOPING LIMITS,
  b. each attachment unit includes a pair of transversely spaced hooks engageable on said mounting elements for supporting the attachment unit thereon for pivoting movement about those elements, the hooks on all the attachment units being so positioned that when they are on the mounting elements the attachment units assume the same position relative to the ground for a given position of the lower links,
  c. the attachment units include transversely spaced elements above said hooks all at the same spacing thereabove for pivotal securement of the upper links to the attachment units, whereby the links assume the same relative position in the case of all the attachment units, and the relation is substantial parallelism between the lower and upper links,
  d. the common means includes a pair of transversely space tension springs above the links secured at a fixed location on the basic unit, and the attachment units have elements above the points of securement of the upper links to the attachment units for securement of the tension springs thereto, and those elements in the different attachment units are so spaced farther or nearer according to the greater or lesser weights of the respective attachment units in the order named.

* * * * *